H. GILLIS.
HARROW.
APPLICATION FILED MAY 13, 1919.

1,348,830.

Patented Aug. 3, 1920.

INVENTOR.
Harry Gillis
BY
Hardway Catt
ATTORNEY

UNITED STATES PATENT OFFICE.

HARRY GILLIS, OF EGYPT, TEXAS.

HARROW.

1,348,830. Specification of Letters Patent. Patented Aug. 3, 1920.

Application filed May 13, 1919. Serial No. 296,805.

*To all whom it may concern:*

Be it known that I, HARRY GILLIS, a citizen of the United States, residing at Egypt, in the county of Wharton and State of Texas, have invented certain new and useful Improvements in Harrows, of which the following is a specification.

This invention relates to new and useful improvements in a harrow.

One object of the invention is to provide a harrow of the character described, formed of sections which are hinged together, so arranged that the harrow will readily conform to the contour of the surface over which it passes.

Another object of the invention resides in the provision of a harrow of the character described, which has been specially designed for harrowing over and pulverizing the ground which has been furrowed off, preparatory to planting, the harrow being formed to follow the sides of the furrow, and having the lateral wings hinged thereto, which follow the beds between the furrows, and which pulverize and cultivate the same.

A further feature of the invention resides in the provision of a harrow, formed of sections hinged together, and equipped with means whereby said sections may be locked in horizontal alinement when it is desired to use the harrow for general harrowing purposes.

With the above and other objects in view, the invention has particular relation to certain novel features of construction, arrangement of parts and use, an example of which is given in this specification and illustrated in the accompanying drawings, wherein.

Figure 1:
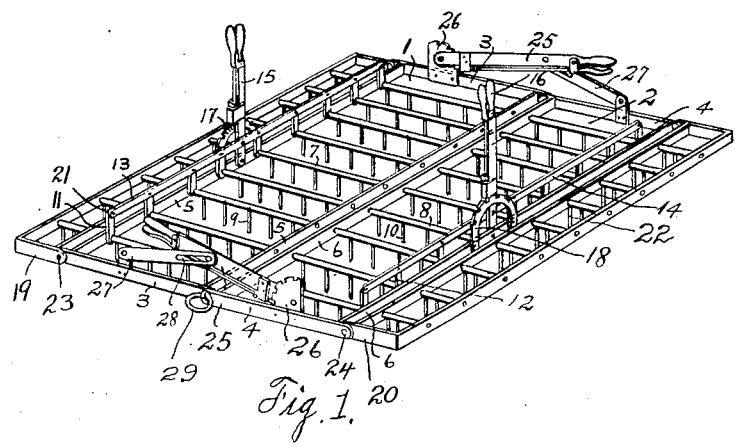
Figure 1, is a perspective view of the harrow.

Referring now more particularly to the drawings wherein like numerals of reference designate similar parts in each of the figures, the numerals 1 and 2, designate the respective sections of the harrow, which are formed with frameworks consisting of the end members, 3, 3, and 4, 4, respectively, and the side members 5, 5, and 6, 6, respectively. These frameworks have the respective cross bars 7 and 8, which are spaced apart, and have bearings in the respective side members 5, 5, and 6, 6, said cross bars having the downward projecting harrow teeth, 9 and 10. The outer ends of the respective cross bars 7, have the upstanding arms 11 fixed thereto, and the outer ends of the respective cross bars 8 have the upstanding arms 12, fixed thereto, and the upper ends of the respective series of arms 11 and 12 are connected by means of the respective shifting bars 13 and 14. These respective bars are pivoted to the respective manual levers 15 and 16, whose lower ends are pivoted to the corresponding side members 5 and 6, and are arranged to be held in any fixed position through the usual rack and dog mechanism 17 and 18. By shifting the manual levers 15 and 16, the angles of the teeth 9 and 10 may be varied as desired.

As before stated, the frameworks 1 and 2 are hinged together, so that their position relative to each other may be varied, depending upon the contour of the ground over which the harrow is to pass. On each side, there is a wing hinged to the corresponding framework, said wings being indicated by the numerals 19 and 20, and consisting of a suitable framework, with the depending harrow teeth 21 and 22. These wings may be removed by removing the rods 23 and 24, by means of which they are hinged to the main harrow. The sections of the harrow 1 and 2, are adjusted relatively to each other, through a mechanism which will now be described.

Figure 2:
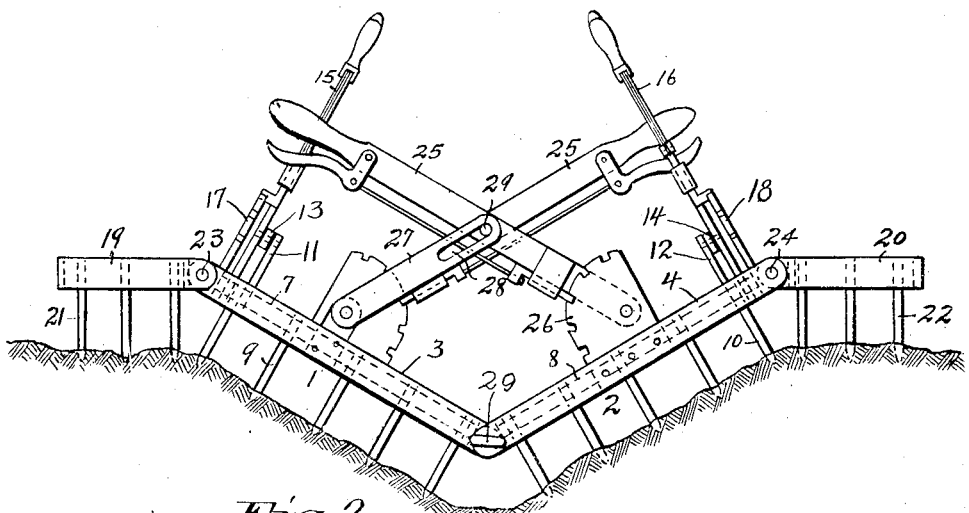
Fig. 2, is an end view thereof.

At each end of the harrow, there is pivoted to one section, the manual lever 25, which is equipped with the usual rack and dog mechanism 26, and pivoted to the other section, there is a link 27 whose free end has an oblong slot 28, and a pin 29, is secured to the corresponding lever 25, and operates in said slot as a bearing. It is obvious that by suitable manipulation of the levers 25, the respective sections of the harrow may be adjusted so as to bring them into horizontal alinement or into an angular position relative to each other. For general purposes in harrowing, the sections of the harrow will be brought into horizontal alinement through a suitable manipulation of the levers 25, and locked in said position through the rack and dog mechanism 26. When it is desired to harrow land that has been furrowed, preparatory to planting, the harrow may be adjusted into the position shown in Fig. 2, and locked in said position for the purpose specified.

What I claim is:

1. A harrow composed of independent sections hinged together, each section consisting of a frame work and adjustable depending harrow teeth, a rack-and-dog arrangement secured to each section, a lever pivotally secured to each rack, one lever having a slot therein, a pin carried by the other lever, which operates in said slot to permit the movement of the levers relatively to each other.

2. A harrow composed of two independent sections hinged together, each section consisting of a frame work and adjustable depending harrow teeth carried by each frame work, a rack-and-dog arrangement secured to each section, a lever pivotally secured to each of said racks, said levers being adjustably secured together, and forming with said rack-and-dog arrangements means for fixing said sections, in any predetermined position, relative to each other, and a wing like section hinged to the outer edge of each of said first mentioned sections and having depending harrow teeth.

In testimony whereof he has signed his name to this specification in the presence of two subscribing witnesses.

HARRY GILLIS

Witnesses:
  Jos. P. Boone,
  Frank B. May.